Dec. 20, 1966   W. E. BURCH, JR   3,293,443
VEHICLE POWER CONVERTER
Filed June 16, 1965
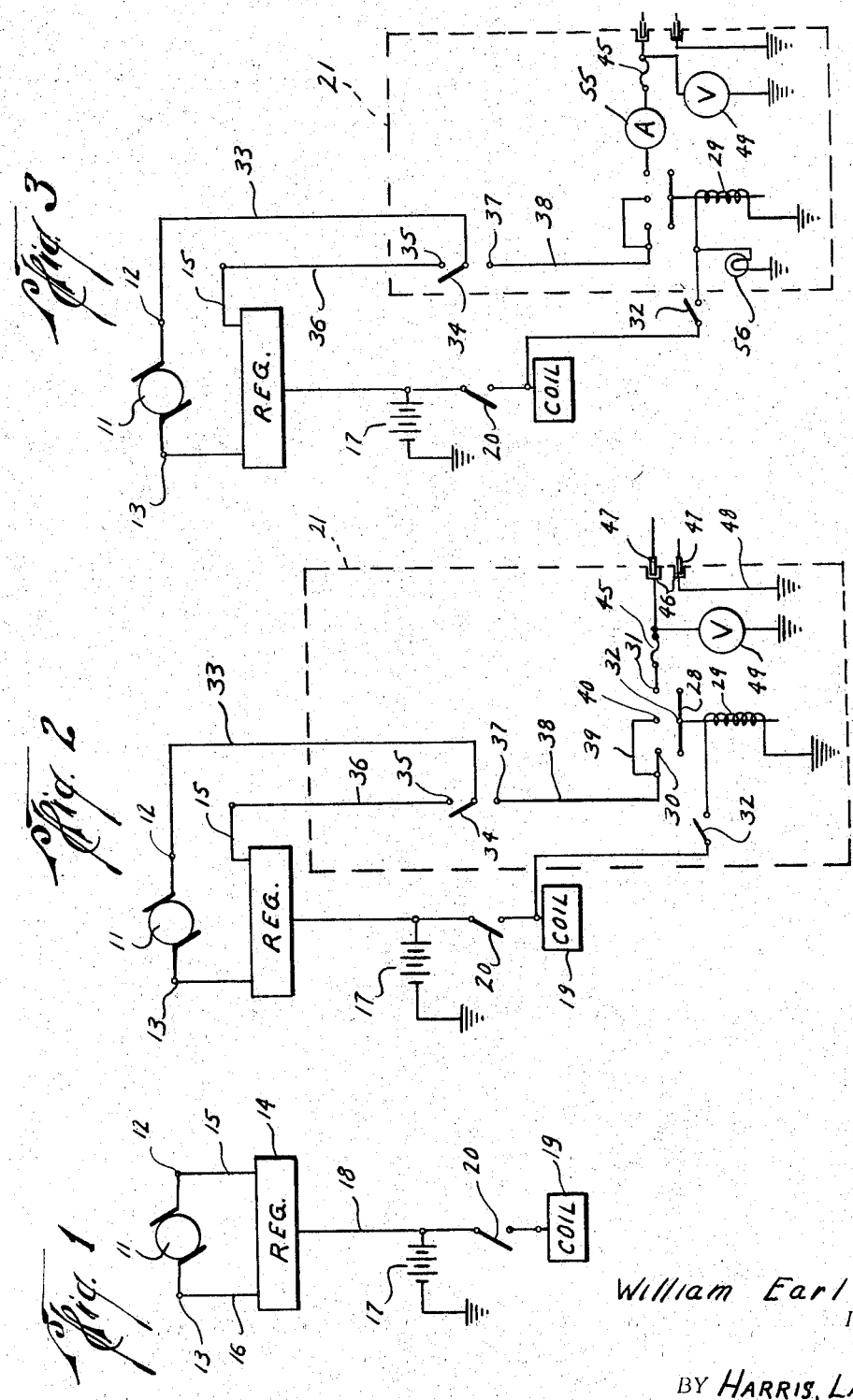
William Earl Burch, Jr.
INVENTOR.
BY Harris, Larkin and
Medlock
ATTORNEYS United States Patent Office 3,293,443
Patented Dec. 20, 1966

3,293,443
VEHICLE POWER CONVERTER
William Earl Burch, Jr., Snook, Tex., assignor to Burch Electronics, Inc., College Station, Tex., a corporation of Texas
Filed June 16, 1965, Ser. No. 464,521
7 Claims. (Cl. 307—38)

This invention generally relates to a power converter for supplying electrical power to an electrical power requiring unit and is adapted for attachment to a vehicle.

More particularly, this invention relates to an apparatus or power converter for supplying electrical power to an electrical power requiring unit and is adapted for attachment to a vehicle having an electrical circuit, which circuit includes a battery, a generator and a regulator, with the regulator having a field terminal connected to the field terminal of the generator and an armature terminal connected to the armature terminal of the generator and a battery output terminal connected to the battery.

The power converter of this invention may sometimes be referred to as a power device which is readily adaptable for installation in a vehicle such as a utility vehicle having an electrical generator driven by the vehicle motor. In performing certain operations, such as providing electrical power to a power requiring unit such as an electrical hand tool, emergency drop lights and the like, it is desirable to make the electrical output of the vehicle generator directly available to the power requiring unit without harm to the electrical circuit of the vehicle itself. An additional use of the power converter includes the charging of run down batteries such as batteries in stalled automobiles, tractors, trucks and the like.

One of the problems in providing electrical power of this nature to such a power requiring unit includes the fact that it must adapt the utility vehicle for many uses over a short span of time without degenerative effect on the vehicle battery or other portions of its electrical circuit.

In addition to providing the power requiring unit with the desired electrical power or energy, it is also desirable to have an apparatus which may be conveniently used for testing the power requiring unit to determine its suitableness to receive the electrical power.

The prior art has provided many examples of apparatuses which have attempted to solve the foregoing problems, but all have been unsuccessful in one or more respects as compared with this invention. For example, power converters have been developed for attachment to vehicles which completely isolate the generator of the vehicle from the balance of its electrical circuit. The result is that the vehicle battery will soon run down since it is receiving no additional charge during the time when the vehicle generator is completely isolated from the rest of the circuit.

Moreover, the prior art power converters are not readily adaptable for supplying power to brush type armature electrical power tools because of the surge and flash created in the electrical supply by the power converter.

It is, therefore, an object of this invention to provide an improved power converter adaptable for attachment to a vehicle and which will overcome the previously noted shortcomings of the prior art.

For purposes of convenience, the term "generator" as used herein refers to both the commonly known D.C. type generator and the A.C. type generator, the latter of which is sometimes commonly referred to as an alternator.

Briefly stated, this invention is a power converter for supplying electrical power to an electrical power requiring unit. The converter is adaptable for attachment to a vehicle having an electrical circuit which includes a battery, a generator and a regulator. The generator is connected to be run by a motor in the vehicle and is of the type having both a field terminal and an armature terminal, with the armature terminal sometimes being referred to as the output terminal. The regulator is of the standard automobile electrical circuit type and includes a field terminal connected to the field terminal of the generator and an armature terminal normally connected to the armature terminal of the generator. The regulator also has a battery output terminal connected to the battery whereby electrical energy may be supplied to the battery to keep it in full charge.

The power converter of this invention includes a relay having a switch with input and output sides and an intermediate contact point therebetween. In addition, the relay is provided with the usual coil which is connected to be selectively activated by an electrical signal from the electrical circuit of the vehicle.

Switch means are provided for selectively connecting the armature terminal of the generator with the input side of the relay switch and simultaneously disconnecting the armature terminal of the regulator from the armature terminal of the generator.

A shunting lead or continuity switch is connected ahead of the input side of the relay switch and has contact means for contacting the intermediate contact point on the relay switch. Connecting means are also provided for connecting the output side of the relay switch to the electrical power requiring unit.

In certain embodiments of the invention the shunting lead or continuity switch may be eliminated, but its inclusion is preferred for reasons noted hereinafter. However, it is to be understood that the field lead of the generator and the field lead of the regulator are always connected and the output of the regulator is always connected to the battery such that even during times when the output of the generator is applied to the power converter there is a feedback to the battery. Hence, it may be stated that the generator of the vehicle is never entirely isolated from the balance of the electrical circuit of the vehicle.

In certain other embodiments of the invention, an ammeter may be connected between the output side of the relay switch and the connecting means which connects the power converter to the electrical power requiring unit.

Reference to the drawing will further explain the invention wherein like numerals refer to like parts and in which:

FIG. 1 is a simplified block diagram of the electrical circuit of a vehicle of the type for which the power converter of this invention is readily adaptable.

FIG. 2 is a block diagram of the electrical circuit of the power converter of this invention showing it connected to the electrical circuit of the type shown in FIG. 1.

FIG. 3 is a block diagram of an alternate embodiment of the invention similar to FIG. 2 but showing certain additions thereto as will be explained hereinafter.

Referring now to FIG. 1, the electrical circuit of the vehicle to which the power converter of this invention is adaptable is generally shown. Generator 11 is of the standard electrical type which is connected to be run by the vehicle motor and has an armature terminal 12 and a field terminal 13. As explained above, the term "generator" is used to include both the standard D.C. type generator and the newer A.C. type generator, sometimes referred to as an alternator.

The circuit is also provided with regulator 14 which may include both voltage and current regulating means. Regulator 14 has the armature terminal thereof connected to armature terminal 12 by lead 15 and the field terminal of regulator 14 is connected to field terminal 13 by lead 16. It is to be understood that leads 15 and 16 may be connected to other electrical apparatuses intermediate the generator 11 and regulator 14 and still serve in the manner described.

Regulator 14 is also provided with a battery terminal which is connected to battery 17 by lead 18. Battery 17 is also connected to ignition coil 19 through ignition switch 20.

Referring now to FIG. 2, the main elements of the power converter which may conveniently be included in a cabinet for attachment and grounding inside the vehicle are generally shown within the dotted square 21. The elements of the power converter include a relay having relay switch 28 and coil 29. Relay switch 28 has an input side and an output side which are respectively adaptable for contact with input and output contact points 30 and 31 upon actuation by relay coil 29. Switch 28 also has an intermediate contact point 32, the purpose of which will be explained hereinafter.

Coil 29 is connected to the electrical system of the vehicle through single post single throw manual switch 32 which is connected to the battery post of ignition coil 19. It is to be understood that connection could also be made to the accessory side of ignition switch 20. Upon the closing of switch 32 an electrical signal is supplied to coil 29 to thereby actuate relay switch 28 to the closed position.

Switch means are also provided for selectively connecting the armature terminal 12 of generator 11 with the input side of relay switch 28 and which at the same time disconnects the armature terminal of regulator 14 from the output of generator 11. This switching means conveniently takes the form of lead 33 which is adaptable for connecting to armature terminal 12 after lead 15 has been removed therefrom. The other end of lead 33 connects with manual switch 34 is a single pole double throw switch which, when placed in the upper closed position, contacts upper contact point 35 which is connected to one end of lead 36. Lead 36 has its other end connected to lead 15, which has been removed from armature terminal 12.

When switch 34 is closed downwardly, it contacts lower contact point 37 which is conncted by lead 38 to input contact point 30.

Relay switch 28 also has connected thereto what may be described as a continuity switch in the form of shunt lead 39 which is connected ahead of contact point 30 and has a contact point 40 which contacts with intermediate contact point 32 when switch 28 is closed. This continuity switch or shunt insures an arc free closing of the contacts of relay switch 28 to thereby eliminate surges and flashes in the D.C. current. This is particularly useful where the power requiring unit to be operated is a brush type armature electrical tool.

Output contact point 31 is connected to a circuit breaker in the form of fuse 45 which in turn is connected to a two channel jack 46 which is adapted to receive cable plug 47 therein. It is to be understood that cable plug 47 may be the cable plug of extension cables or the plug of the cables to a power tool, or the plug for the attachment of charging cables adapted for connection to a run down battery. One channel of jack 46 is connected to ground through lead 48. Jack 46, plug 47, and the cable leads to the power requiring unit may sometimes be referred to as connecting means. In certain embodiments of the apparatus, voltmeter 49 is connected to the positive channel of jack 46 for purposes to be hereinafter explained.

In operation, the apparatus of the invention will be connected to the vehicle electrical circuit in the manner shown in FIG. 2. During normal operation of the vehicle, switch 34 will be closed with contact point 35 so that the vehicle electrical circuit will continue to be essentially the same as shown in FIG. 1, i.e., the output through armature terminal 12 of generator 11 will be applied to regulator 14 through leads 33, 36 and 15.

When it is desirable to place the power converter of this invention into operation, switch 34 will be moved to close with lower contact point 37.

Switch 32 will be closed thereby applying an electrical signal to coil 29 which thereby causes relay switch 28 to close with the respective contact points 30, 40 and 31. An electrical current is then provided through fuse 45, through jack 46, through plug 47 to the appropriate electrical power requiring unit which is to be operated. When it is desirable to discontinue the supplying of power to the electrical power requiring unit, switch 32 is placed in the open position, switch 34 is closed for contact with upper contact point 35, and cable plug 47 may be removed from jack 46.

It will thus be observed that generator 11 is never completely isolated from the balance of the vehicle electrical system during operation of the power converter. This is obvious since field terminal 13 of generator 11 remains connected to regulator 14 at all times and regulator 14 is at all times connected to battery 17 through lead 18. It has been found that this arrangement provides an electrical feedback to battery 17 during operation of the power converter, which feedback supplies a reduced amount of electrical currrent to the electrical system of the vehicle and to battery 17, such that battery 17 will not be quickly and easily run down. This particularly important where the power converter is used for an extended period of time. Without this feedback an ordinary vehicle battery might be run down in a period of one hour's time. In addition, the device as explained, is adaptable for running power tools of the type described without deleterious effects thereon and without harm to the vehicle to which the power converter is attached.

In addition, the continuity switch in the form of shunt lead 39 insures arc free closings of the contacts of relay switch 28, which thereby eliminates surge and flash in the D.C. circuits and thereby makes the output of the power converter adaptable for use in running electrical power tools of the type described above. The output of the power converter is also adaptable for charging various type of batteries. Lead 39 also aids in eliminating the hazard of putting too much heat into a battery during charging thereof since it helps to diffuse the heat created in switch 28.

FIG. 3 shows an alternate embodiment of the instant invention which is the same as that shown in FIG. 2 with certain additions which will now be explained. In this embodiment, ammeter 55 has been connected between contact point 31 and fuse 45. In addition, dash light 56 has been connected between coil 29 and switch 32. Light 56 merely indicates when switch 32 has been closed.

Ammeter 55 indicates the amount of current flowing through the power converter and which is supplied to the electrical power requiring unit connected to jack 46.

The purpose of ammeter 55 is to aid in gauging the amount of electrical power supplied to the power requiring unit. It has been found that when charging a battery with the apparatus shown in FIG. 3, a 6-volt battery requires about 5 to 6 minutes to fully charge, an 8-volt battery requires 6 to 7 minutes to fully charge, a 12-volt battery requires 7 to 10 minutes to charge and a 24-volt battery requires 10 to 20 minutes to charge.

In charging a battery, the engine of the vehicle carrying the power converter should be started, switch 32 closed, switch 34 closed to contact point 37 and the engine of the vehicle should be run at such a speed as to provide approximately 30 amps. to ammeter 55. Usually the idle speed will accomplish this charge rate. It is never desirable to charge continuously at a rate above 30 amps. Intermittent charging is possible at a higher rate but should never be maintained longer than 10 to 15 seconds. Longer periods of high rate charge will result in a blown fuse.

There are also certain other operations, such as testing, which may be carried out by the use of the instant power converter. If, for example, when charging a battery with either the apparatus as shown in FIGS. 2 and 3, and battery charging cables are connected to plug 46 and the other ends of the cables are connected to the battery to be charged, if voltmeter 49 does not show any voltage or down scale reading but remains on zero, this would be an indication of a short or broken wire which should be located and corrected before proceeding with charging the battery.

The apparatus also provides the means for checking the battery to be charged for defective cells. After charging is completed, then switch 32 is placed in the open position and switch 34 is closed with contact point 35. If the voltmeter 49 shows a drop of 2 volts and then stabilizes, this would indicate a defective cell in the battery being charged. A drop of 4 volts indicates two bad cells and so forth.

If the cables are connected to the battery and the power converter is turned on as explained above with the generator in operation and the voltmeter shows 20 to 30 volts and the ammeter is not registering on a 6- or 12-volt battery, one or more of the following defects exist: there is no water in one or more cells, there is a loose connection of battery cables, there is a broken battery cell connector, or a very weak battery. If the last condition exists, the voltmeter 49 should fall back to normal and ammeter 55 should begin to show charge after a few seconds.

In checking for a defective regulator in the vehicle carrying the run down battery, the following check can be made after charging the run down battery: with the switches of the power converter turned to the off position, if voltmeter 49 then shows a drop in voltage and this drop continues until it reaches zero, this would indicate a defective regulator in the vehicle carrying the run down battery.

Various other checks may be made as is well known to those skilled in the art, such as for example the checking for defective generator or a dragging starter.

In operating power tools from the power converter of this invention, usually a 50 volt rate is sufficient and the motor of the vehicle containing the power converter should be run at a rate sufficient to cause the generator 11 to provide that output.

It will thus be observed that the art has been provided with a relatively simple device for use in converting electrical power from the generator of a vehicle to various uses in a manner which has not heretofore been accomplished. The apparatus is relatively inexpensive and easy to install in a vehicle which makes it acceptable to a wide variety of consumer uses.

Modifications may be made in the invention as particularly described without departing from the scope of the invention. Accordingly, the foregoing description is to be considered as illustrative only and is not to be construed as a limitation upon the invention as defined in the following claims.

What is claimed is:

1. A power converter for supplying electrical power to an electrical power requiring unit and adapted for attachment to a vehicle having an electrical circuit including a battery, a generator, and a regulator, said regulator having a field terminal connected to the field terminal of said generator, an armature terminal normally connected to the armature terminal of said generator, and a battery output terminal connected to said battery, said power converter comprising:
   a relay having a switch with input and output sides and an intermediate contact point therebetween and having a coil connected to the electrical circuit of said vehicle through first switch means;
   second switch means for selectively connecting the armature terminal of said generator with the input said of said relay switch and disconnecting the armature terminals of said regulator and said generator;
   a continuity switch connected ahead of the input side of said relay switch and having contact means for contacting the intermediate contact point on said relay switch; and
   means for connecting the output side of said relay switch to said electrical power requiring unit.

2. A power converter for supplying electrical power to an electrical power requiring unit and adapted for attachment to a vehicle having an electrical circuit including a battery, a generator, and a regulator, said regulator having a field terminal connected to the field terminal of said generator, an armature terminal normally connected to the armature terminal of said generator, and a battery output terminal connected to said battery for supplying an electrical current thereto, said power converter comprising:
   a relay having a switch with input and output sides and an intermediate contact point therebetween, and having a coil adapted for actuating said switch;
   first switch means for selectively applying an electrical signal from the electrical circuit of said vehicle to said coil of said relay for actuating said relay switch;
   second switch means for selectively connecting the armature terminal of said generator with the input side of said relay switch and disconnecting the armature terminals of said regulator and said generator while leaving the field terminals of said generator and regulator connected and the battery output of said regulator connected to said battery;
   a continuity switch connected ahead of the input side of said relay switch and having contact means for contacting the intermediate contact point of said relay switch; and
   connecting means for connecting the output side of said relay switch to said electrical power requiring unit.

3. A power converter for supplying electrical power to an electrical power requiring unit and adapted for attachment to a vehicle having an electrical circuit including a battery, a motor driven electrical generator, and a regulator, said regulator being connected to both the field terminal and the armature terminal of said generator and to said battery, said power converter comprising:
   a relay having a relay switch with input and output sides and an intermediate contact point therebetween, and having a coil for actuating said relay switch;
   a first manual switch connected to the electrical circuit of said vehicle and to said coil for selectively applying an electrical signal to said coil to thereby operate said relay switch;
   a second manual switch connected to the armature terminal of said generator, the input side of said relay switch, and to said regulator, for selectively applying the output of said generator to the input of said relay switch while leaving the battery output of said regulator connected to said battery;
   a continuity switch connected ahead of the input side of said relay switch and having contact means for contacting said intermediate contact point of said relay switch; and
   cable means for connecting the output side of said relay switch to said electrical power requiring unit.

4. The apparatus as claimed in claim 3 including:
   an ammeter connected between the output side of said relay switch and said electrical power requiring unit.

5. The apparatus as claimed in claim 3 including:
   a voltmeter connected to said connecting means.

6. A power converter for supplying electrical power to an electrical power requiring unit and adapted for attachment to a vehicle having an electrical circuit including a battery, a motor driven electrical generator, a regulator, a first cable normally connecting the armature terminals of said generator and regulator, a second cable connecting the field terminals of said generator and regulator, and a third cable connecting said regulator to said battery, said power converter comprising:
- a fourth cable for attaching at one end to the armature terminal of said generator when said first cable has been disconnected therefrom;
- a fifth cable for attaching at one end to said first cable after said first cable has been disconnected from said generator;
- a first manual switch connected to the other ends of said fourth and fifth cables and adapted to selectively connect said fourth and fifth cables in one position and to disconnect said fourth and fifth cables in another position;
- a relay having a switch and a coil, said switch having input and output sides and a contact point intermediate thereof, and having the input side thereof connected to the output of said generator through said first manual switch when said first manual switch is in the position which disconnects said fourth and fifth cables;
- a shunting lead connected ahead of the input side of said relay switch and having contact means for contacting said intermediate contact point when said relay switch is in the closed position;
- a second manual switch connected to the electrical circuit of said vehicle and adapted to selectively supply an electrical signal to said coil of said relay switch in the closed position to thereby actuate said relay switch;
- a fuse having one side thereof connected to the output side of said relay switch;
- a two channel plug jack connected to said fuse and adapted to receive the plug in end of an extension cable; and
- a voltmeter attached to the positive channel of said jack and grounded in said vehicle.

7. The power converter claimed in claim 6 including:
an ammeter connected between the output of said relay switch and said fuse.

References Cited by the Examiner

UNITED STATES PATENTS

| 3,090,871 | 5/1963 | Gorman | 307—10 |
| 3,098,191 | 7/1963 | Gavent | 322—79 |
| 3,105,910 | 10/1963 | Chambers | 307—49 |
| 3,127,518 | 3/1964 | Pruitt | 307—10 X |
| 3,174,048 | 3/1965 | Snyder | 307—10 |

ORIS L. RADER, *Primary Examiner.*

T. J. MADDEN, *Assistant Examiner.*